United States Patent
Lai

(10) Patent No.: US 8,727,192 B2
(45) Date of Patent: May 20, 2014

(54) HANDSET HOLDER

(76) Inventor: Chin-I Lai, Tainan (TW)

( * ) Notice: Subject to any disclaimer, the term of this patent is extended or adjusted under 35 U.S.C. 154(b) by 100 days.

(21) Appl. No.: 13/313,536

(22) Filed: Dec. 7, 2011

(65) Prior Publication Data

US 2013/0146632 A1   Jun. 13, 2013

(51) Int. Cl.
B60R 7/06   (2006.01)

(52) U.S. Cl.
USPC ........... 224/420; 224/282; 224/483; 224/572; 224/929; 248/316.4

(58) Field of Classification Search
USPC ......... 224/420, 276, 483, 282, 275, 572, 320, 224/929, 556, 570; 206/320; 455/575.9, 455/575.8; 379/454, 455, 450, 446, 449; D2/218; D12/415, 416; 248/316.4
See application file for complete search history.

(56) References Cited

U.S. PATENT DOCUMENTS

| | | | | |
|---|---|---|---|---|
| 5,179,590 A * | 1/1993 | Wang | ............................. | 379/454 |
| 5,457,745 A * | 10/1995 | Wang | ............................. | 379/454 |
| 5,788,202 A * | 8/1998 | Richter | ..................... | 248/316.4 |
| 5,979,724 A * | 11/1999 | Loewenthal et al. | ......... | 224/483 |
| 5,996,866 A * | 12/1999 | Susko et al. | .................. | 224/281 |
| 6,371,345 B1 * | 4/2002 | Leyden et al. | ................. | 224/553 |
| 7,152,834 B2 * | 12/2006 | Hsu | ............................. | 248/230.1 |
| 7,672,701 B2 * | 3/2010 | Piekarz | ...................... | 455/575.9 |
| 7,857,178 B2 * | 12/2010 | Brown, Jr. | ..................... | 224/483 |
| 8,041,029 B2 * | 10/2011 | Wiegers | ........................ | 379/455 |
| 8,262,070 B2 * | 9/2012 | Liu | ........................... | 269/254 R |
| 2002/0191782 A1 * | 12/2002 | Beger et al. | ................... | 379/454 |
| 2003/0106919 A1 * | 6/2003 | Chuang | ......................... | 224/420 |
| 2004/0254002 A1 * | 12/2004 | Tsay | .......................... | 455/575.9 |
| 2005/0045681 A1 * | 3/2005 | Hancock et al. | ............. | 224/401 |
| 2005/0288068 A1 * | 12/2005 | Tsay | .......................... | 455/569.2 |
| 2006/0215836 A1 * | 9/2006 | Wang | ............................ | 379/455 |
| 2009/0014487 A1 * | 1/2009 | Fan | ................................ | 224/483 |
| 2012/0080465 A1 * | 4/2012 | Son | ................................ | 224/276 |

* cited by examiner

Primary Examiner — Justin Larson
Assistant Examiner — Phillip Schmidt
(74) Attorney, Agent, or Firm — Muncy, Geissler, Olds & Lowe, P.C.

(57) ABSTRACT

A handset holder includes a holder, a strap means and a positioning member. The holder has a coupling portion at a rear end with external threads formed thereon. The coupling portion has an indented chamber to hold a chuck. The strap means includes a seat and a strap fastened to the seat. The seat has a ball head at a front end held in the chuck and a retaining slot threaded through by the strap. The positioning member mates the coupling portion and is fastenable therewith by screwing. The handset holder can be fastened to any type of vehicle tubular members through the strap. The holder is adjustable to a desired angle via the ball head and formed a firm positioning by tightly clamping the chuck via the positioning member. It is simpler to install and remove and provides wider applicability and improved practicality.

4 Claims, 9 Drawing Sheets

HANDSET HOLDER

FIELD OF THE INVENTION

The present invention relates to a handset holder and particularly to a handset holder installable on a vehicle bar by strapping.

BACKGROUND OF THE INVENTION

Handset has become an indispensable communication tool of people nowadays. To make using easier in a vehicle or indoor a handset holder has been developed and introduced on the market. A conventional simpler handset holder has a seat with a back side attached double-sided adhesive to be bonded to a wall, a table edge or the dashboard at the windshield of a vehicle. However, the double-sided adhesive leaves an unsightly trace on the bonding surface when it is no longer in use and removed. To remedy this problem clip or strap type handset holders have been developed and marketed.

A clip type handset holder has a seat with the back side holding an elastic reed which can be clipped on an air-conditioning vane of a vehicle. The strap type has a bonding strap threading through the back side of a seat to be fastened to the upper lid of a hand rest in the vehicle. The clip type handset holder makes adjusting the air-conditioning outlet. The strap type handset holder occupies the hand rest and could be hit inadvertently by a driver's elbow, thus becomes an annoying concern. Because of those drawbacks, another type of suction cup handset holder has been developed and becomes more popular. Please refer to FIG. 1 for a conventional suction cup handset holder 1. It has a seat 11 with a suction cup holder 12 extended form the rear side to be attached to the windshield of a vehicle. It has to be mounted onto a glass surface or a smooth surface to form secure bonding. Hence its applicability is limited. Nowadays people care very much about leisure activities. When people do not drive cars for outdoor activities they could ride bicycles or move a baby carriage to transport a small child for excursion during holidays or at leisure time. In these occasions how to properly take care the handset becomes a troubling concern.

To develop a universal handset holder adaptable for general use is a need yet to be fulfilled and an aim of the invention.

SUMMARY OF THE INVENTION

The primary object of the present invention is to overcome the disadvantage of limited applicability of the conventional handset holders by providing an improved handset holder that is easier to install and remove and has greater adaptability.

To achieve the foregoing object the handset holder according to the invention includes a holder, a strap means and a positioning member. The holder has a holding portion at a front end and a protrusive coupling portion at a rear end with external threads formed thereon. The coupling portion has an indented chamber to hold a chuck. The chuck includes a plurality of clamp claws spaced from each other in an annular manner. The strap means includes a seat and a strap fastened to the seat. The seat has a ball head at a front end thereof to be held in the chuck and a retaining slot to be threaded through by the strap. The positioning member is a lid with an opening formed in the center and internal threads formed on an inner rim to be fastened to the mating coupling portion by screwing.

By means of the structure set forth above, the invention provides many advantages, notably:

1. The structure of the invention is simpler and easier to use. Through the strap means the invention can be securely fastened to a transportation means equipped with a tubular member, such as a baby carriage or bicycle. It provides improved usability.

2. The ball head of the strap means is held in the chuck of the holder. When in use the positioning member can be loosened to release the forced clamp of the chuck so that the strap means can be easily turned to adjust the angle against the holder. Hence when the invention is strapped on a tubular member its usability is not affected by the angle of tubular member. Thus the invention can provide greater adaptability and applicability.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENTS

Figure 1:
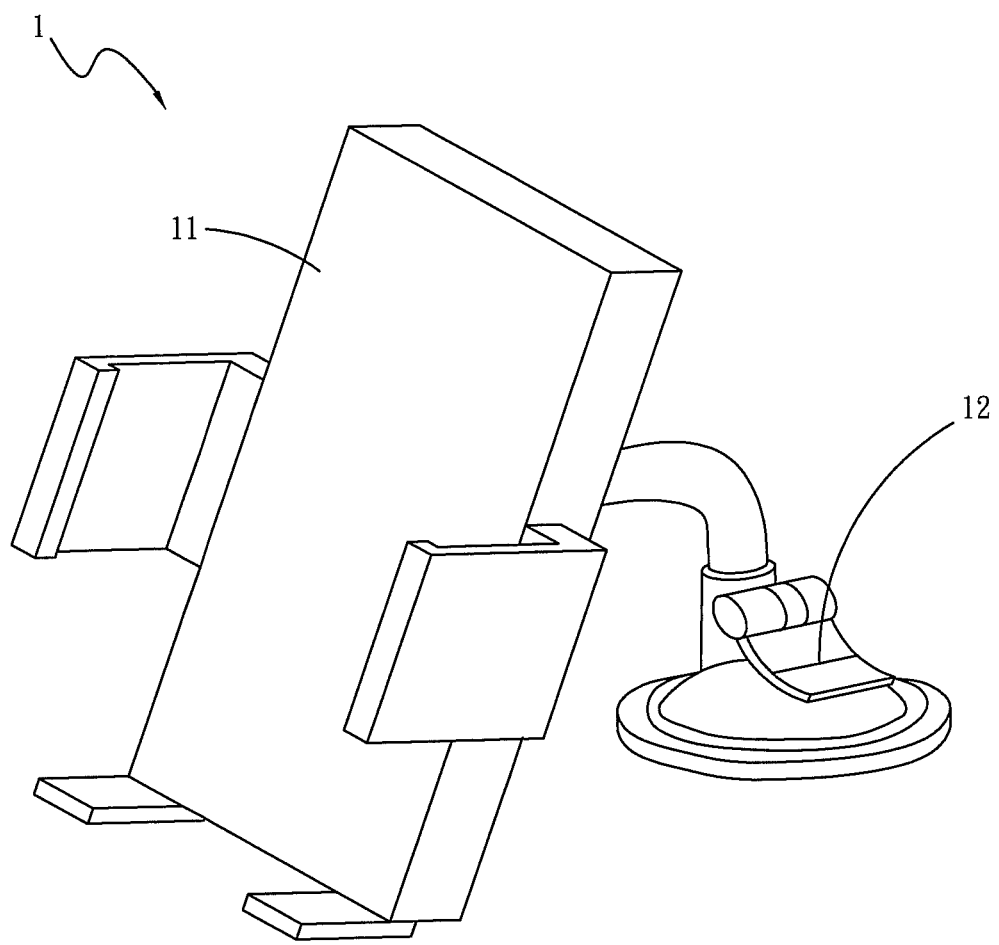
FIG. 1 is a perspective view of a conventional suction cup handset holder.
Figure 2:
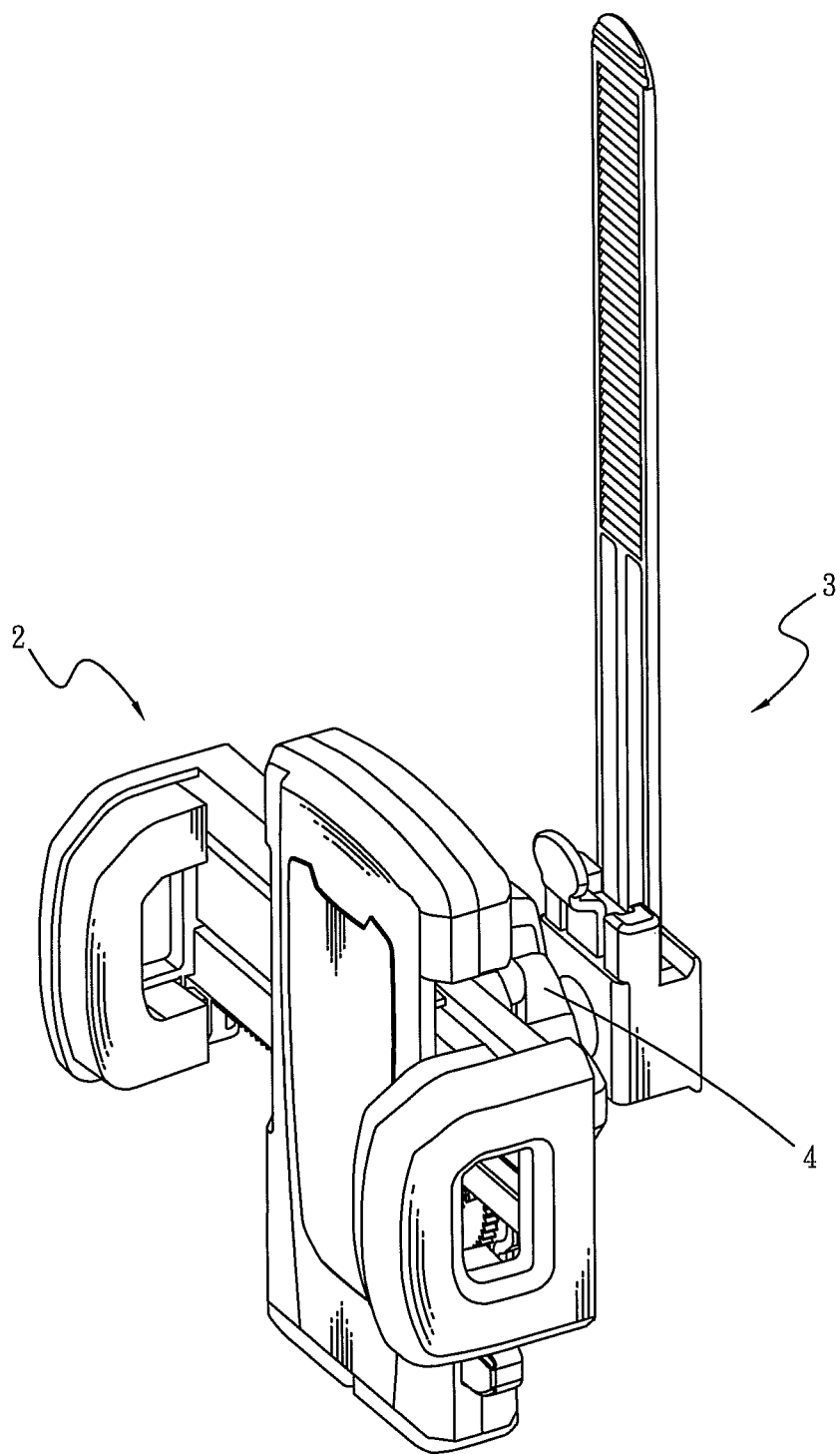
FIG. 2 is a perspective view of the invention.
Figure 3:
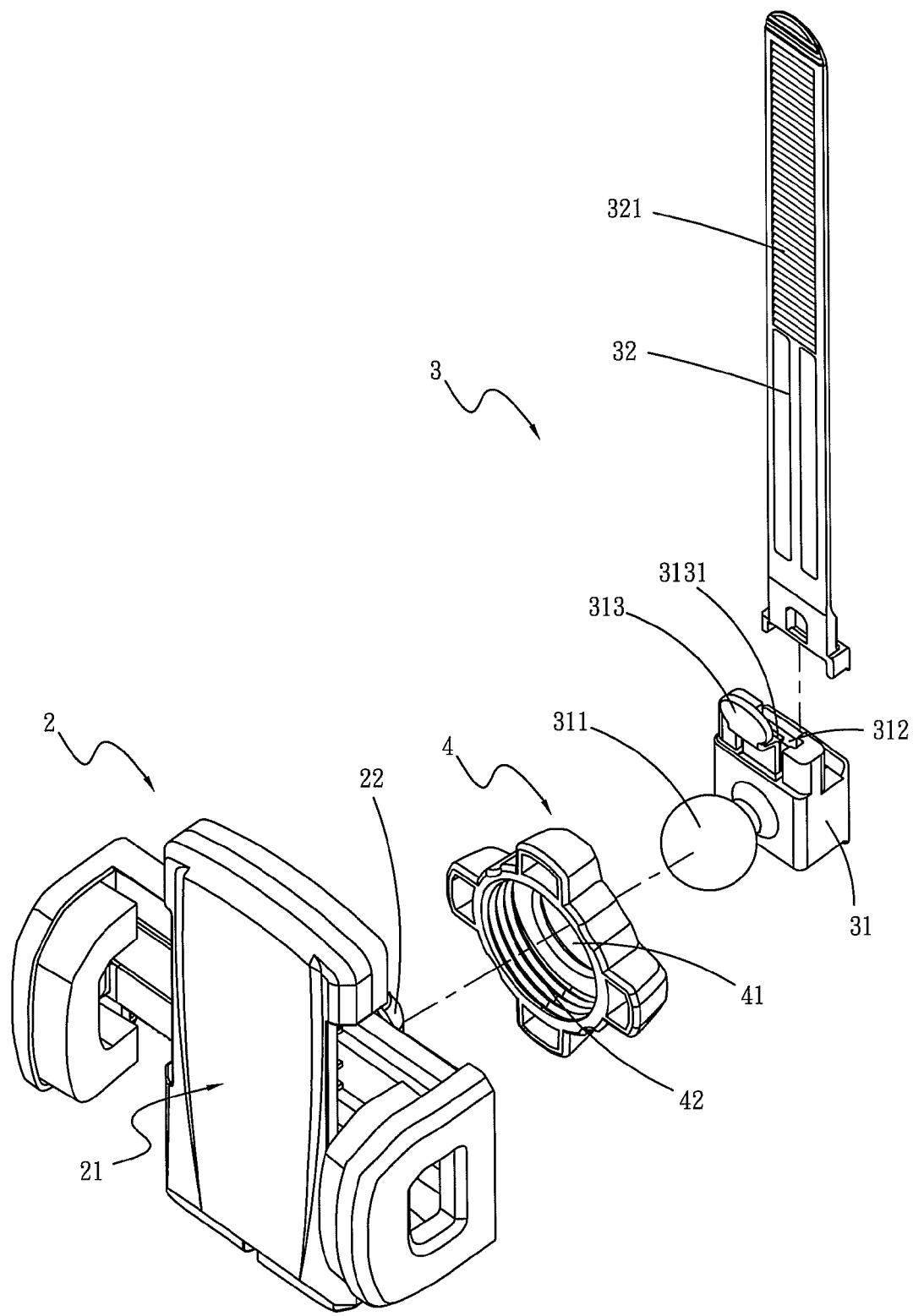
FIG. 3 is an exploded view of the invention.
Figure 4:
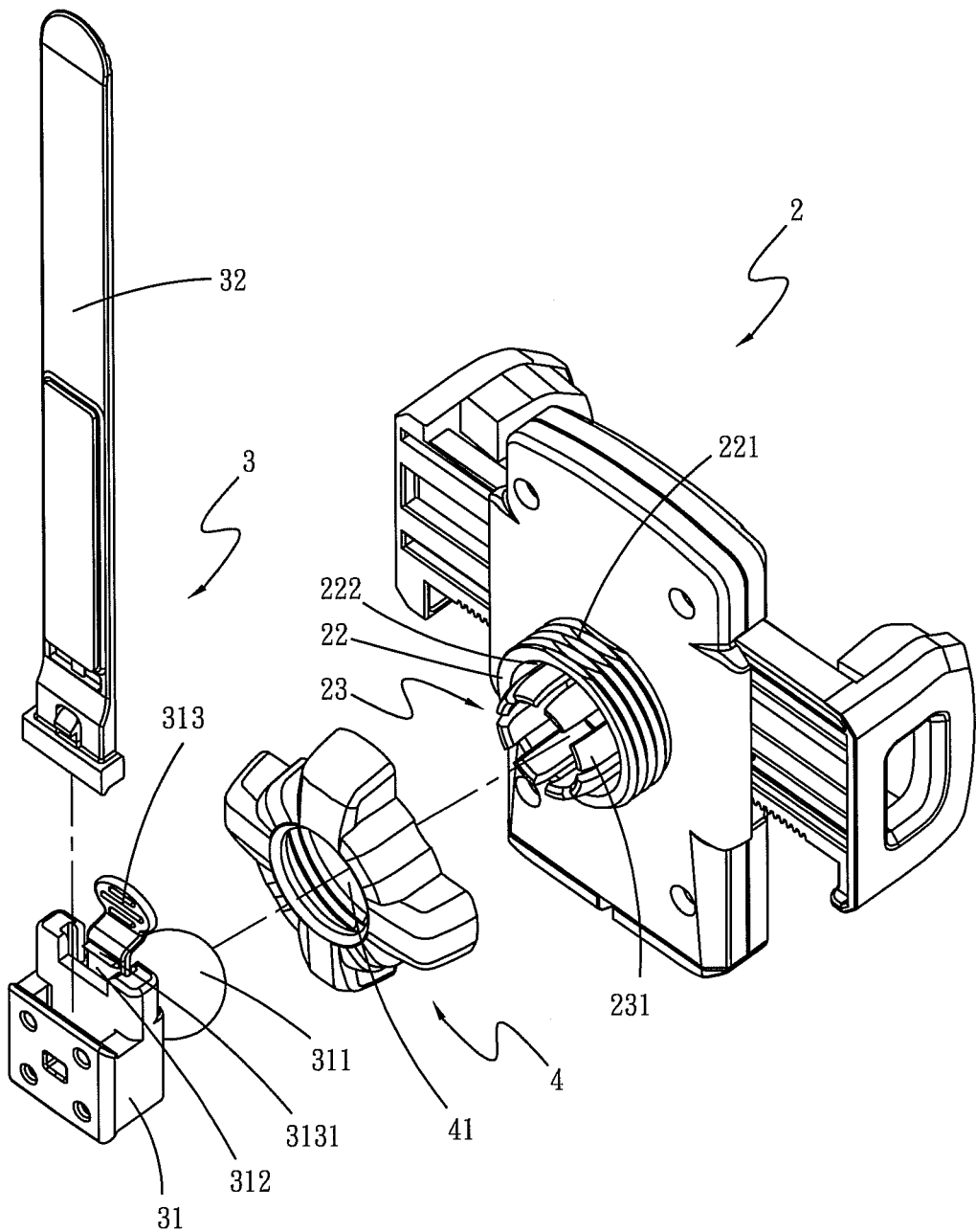
FIG. 4 is another exploded view of the invention.
Figure 5:
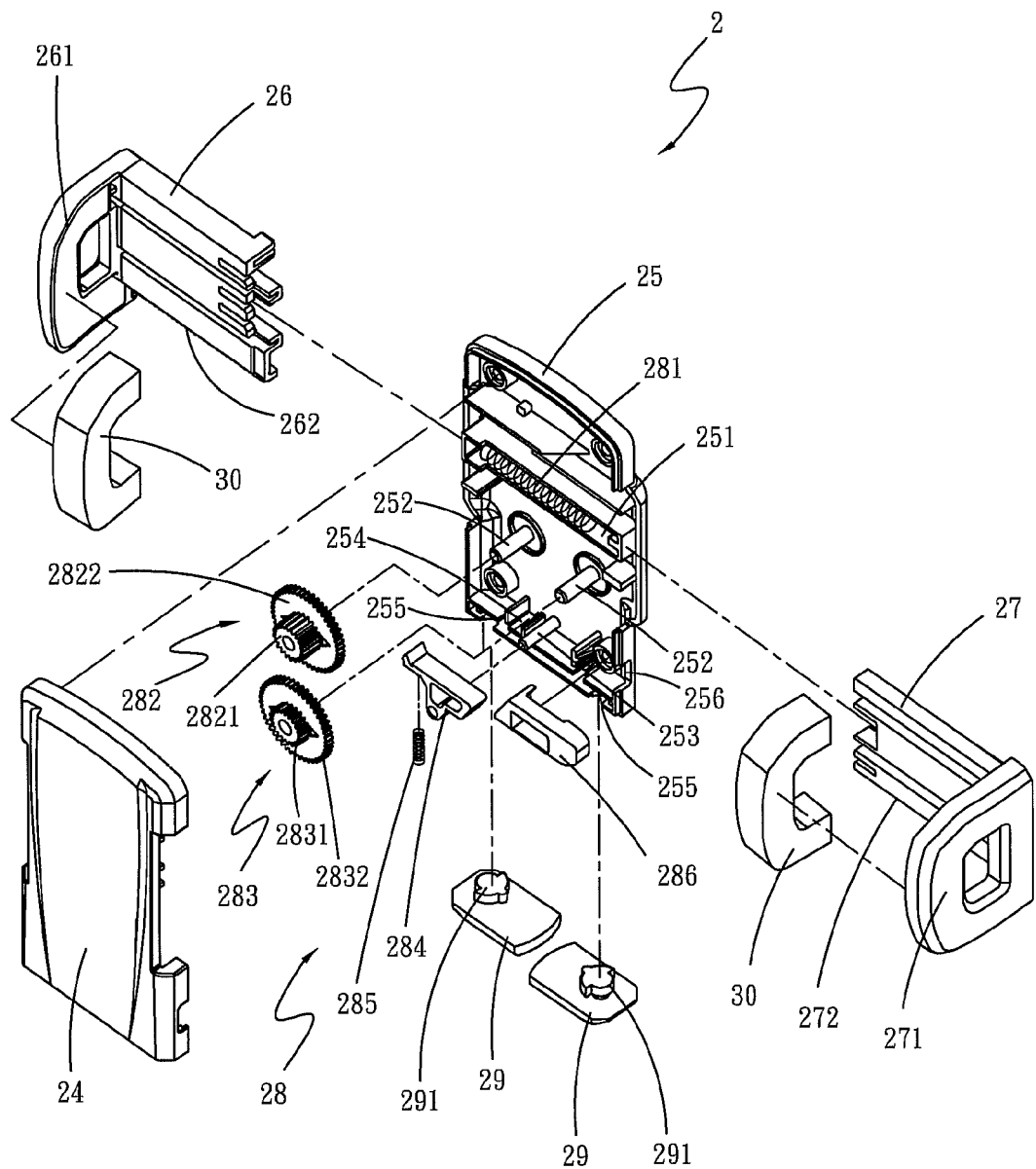
FIG. 5 is an exploded view of an embodiment of the holder of the invention.
Figure 6:
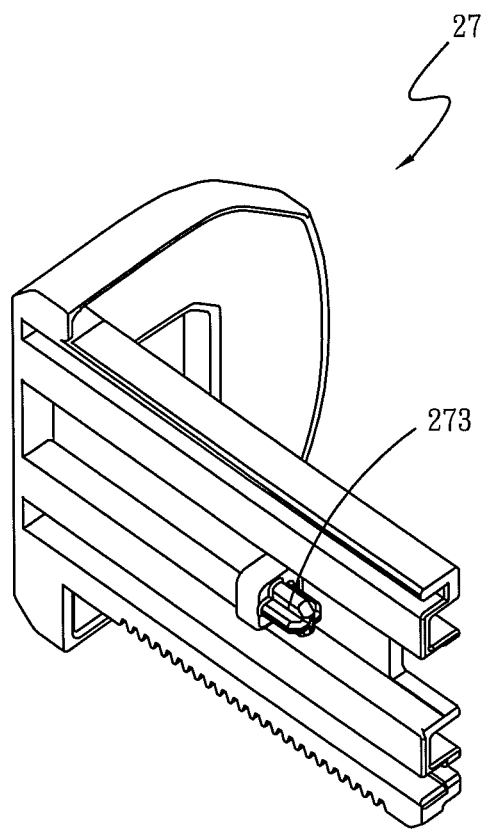
FIG. 6 is a perspective view of an embodiment of the right clamp wing of the invention.
Figure 7:
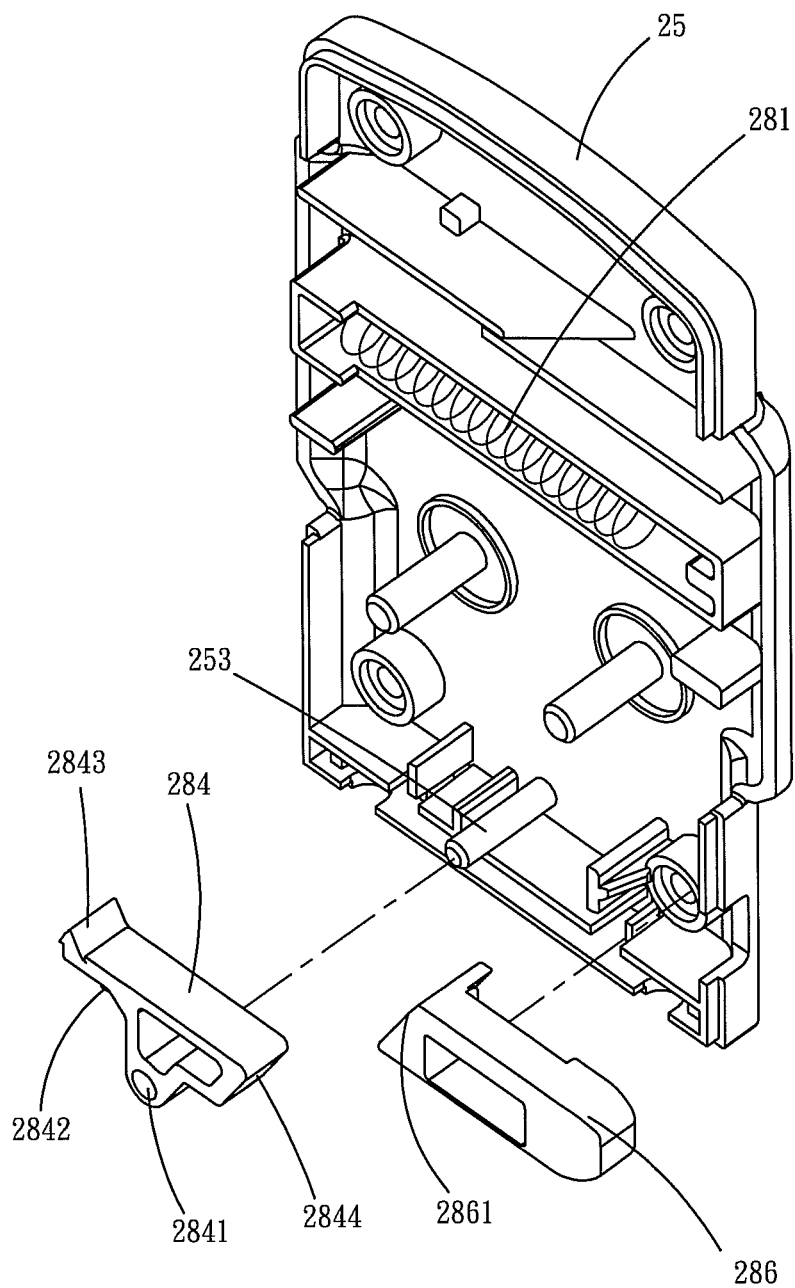
FIG. 7 is a schematic view of an embodiment of the retaining member and pushbutton of the invention.
Figure 8:
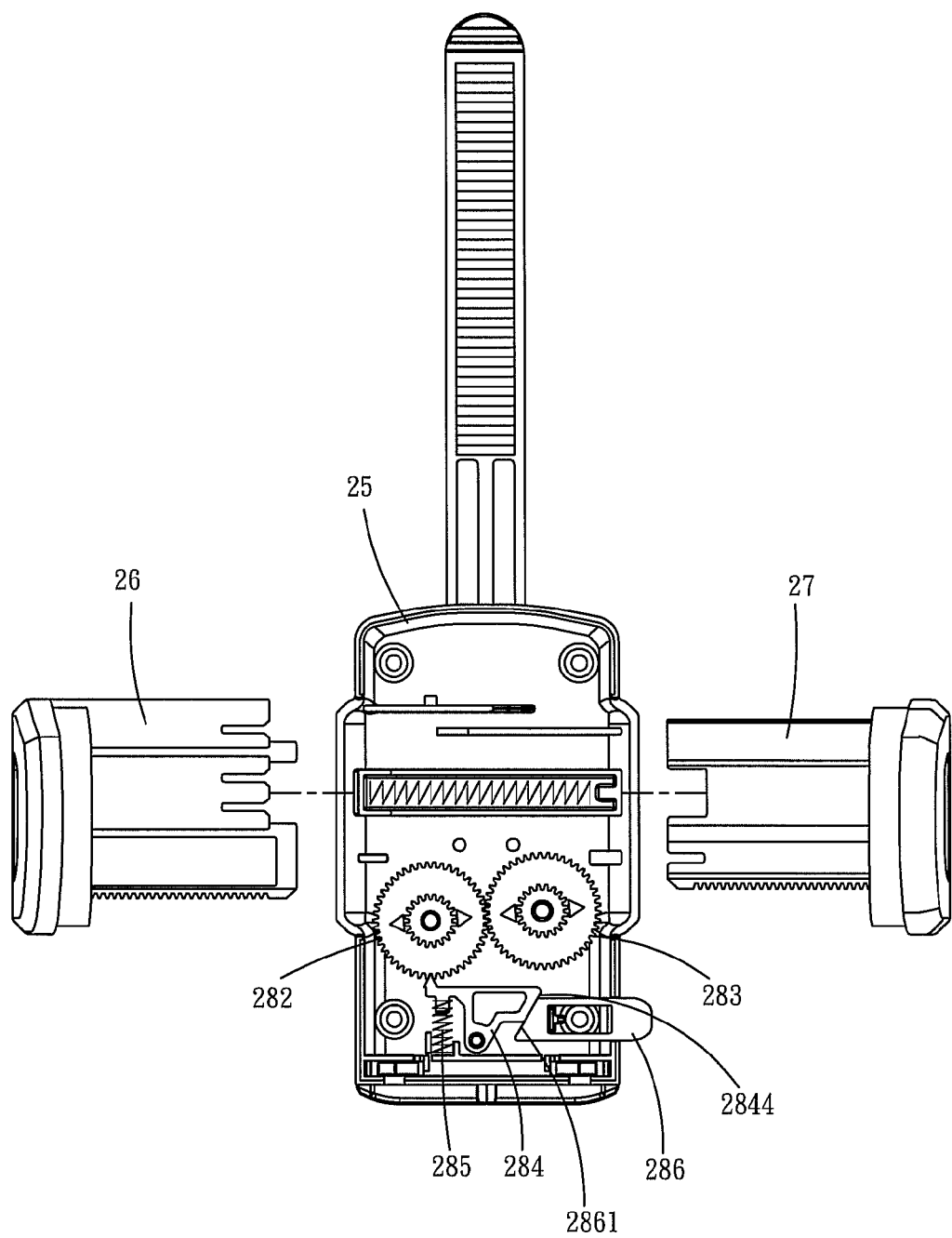
FIG. 8 is a front view of an embodiment of the invention.

Please referring to FIGS. 2 through 4, the present invention aims to provide a handset holder which includes a holder 2, a strap means 3 and a positioning member 4.

The holder 2 has a holding portion 21 at a front end and a protrusive coupling portion 22 at a rear end with external threads 221 formed thereon. The coupling portion 22 has an indented chamber 222 to hold a chuck 23. The chuck 23 includes a plurality of clamp claws 231 spaced from each other in an annular manner.

The strap means 3 includes a seat 31 and a strap 32 fastened to the seat 31. The strap 32 has a latch teeth section 321 on one surface and a ball head 311 held in the chuck 23. The seat 31 also has a retaining slot 312 threaded through by the strap 32 and a latch handle 313 extended from one side of the retaining slot 312. The latch handle 313 has a jutting end 3131 pointed towards the latch teeth section 321 and latchable on the latch teeth section 321.

The positioning member 4 is a lid with an opening 41 formed in the center and internal threads 42 formed on an inner rim to be fastened to the mating coupling portion 22 by screwing.

Please refer to FIGS. 5 through 8 for an embodiment of the holder 2. It includes a front lid 24, a rear lid 25, a left clamp wing 26, a right clamp wing 27, an adjustment assembly 28 and two support members 29. The front lid 24 and rear lid 25 mate each other and are coupled together. The rear lid 25 has a housing trough 251 at an upper side, two struts 252 located at a lower side of the housing trough 251 in an abreast manner, a fastening strut 253 located below the struts 252, a latch cavity 254 at the bottom side, and two hinged holes 255 at two sides and a notch 256 on one lateral side. The left clamp wing 26 and right clamp wing 27 have respectively a left clamp portion 261 and a right clamp portion 271 extended outwards from an edge with respectively an inner side corresponding to each other that may be attached a soft pad 30 made from sponge or rubber to enhance clamping steadiness during holding a handset. The left clamp wing 26 and right clamp wing 27 further have respectively a left saw teeth portion 262 and a right saw teeth portion 272 at the bottom edge. The right clamp wing 27 also has a boss 273 jutting from a rear side (referring to FIG. 6). The left clamp wing 26 and right clamp wing 27 are held in the housing trough 251 mating each other.

The adjustment assembly 28 includes a transverse spring 281, a left gear set 282, a right gear set 283, a retaining member 284, an upright spring 285 and a pushbutton 286. The transverse spring 281 is located in the housing trough 251 of the rear lid 25 with one end coupled on the boss 273 of the right clamp wing 27. The left gear set 282 includes a first gear 2821 of a smaller diameter and a second gear 2822 of a greater diameter. The right gear set 283 includes a third gear 2831 of a smaller diameter and a fourth gear 2832 of a greater diameter. The left gear set 282 and right gear set 283 are coupled respectively on the two struts 252 of the rear lid 25. The second gear 2822 and fourth gear 2832 are engaged with each other. The first gear 2821 and third gear 2831 are engaged respectively with the left saw teeth portion 262 of the left clamp wing 26 and the right saw teeth portion 272 of the right clamp wing 27. The retaining member 284 has a positioning hole 2841 at a lower end with a protrusive portion 2842 formed at a lower end of one side. The positioning hole 2841 is coupled on the fastening strut 253 of the rear lid 25. The retaining member 284 further has a protrusive latch portion 2843 at an upper end of one side latched on a lower end of the second gear 2822, and a slant surface 2844 on another side. The upright spring 285 has a lower end butting in the latch cavity 254 of the rear lid 25 and an upper end coupled on the protrusive portion 2842 of the retaining member 284. The pushbutton 286 has one end extended outside the notch 256 of the rear lid 25 depressible by a user, and another end formed an inclined portion 2861 butting the slant surface 2844 of the retaining member 284. Each support member 29 has a pivotal head 291 hinged in the hinged hole 255 of the rear lid 25.

When the invention is in use, wind the strap 32 around any tubular member of a baby carriage or bicycle, and thread the strap 32 from a lower side upwards through the retaining slot 312, then stretch the strap 32 tightly; latch the pointed end 3131 of the latch handle 313 on the latch teeth section 321 of the strap 32 to form secure fastening; next, the user can push the pushbutton 286 of the holder 2 with the inclined portion 2861 pressing the slant surface 2844 of the retaining member 284, the latch portion 2843 escapes the second gear 2822; meanwhile, the transverse spring 281 provides an elastic force to push the left clamp wing 26 and right clamp wing 27 bouncing away towards two sides so that the user can place a handset (not shown in the drawings) thereon; turn the support members 29 to provide support at the bottom, the left clamp wing 26 and right clamp wing 27 can be moved inwards to clamp the handset securely. In the event that adjusting the angle is wanted, loosen the positioning member 4 and turn the holder 2 to adjust the relative angle between the ball head 311 and chuck 23; then screw the positioning member 4 on the coupling portion 22 to form secure positioning again. It is simpler and easier in use.

Figure 9:
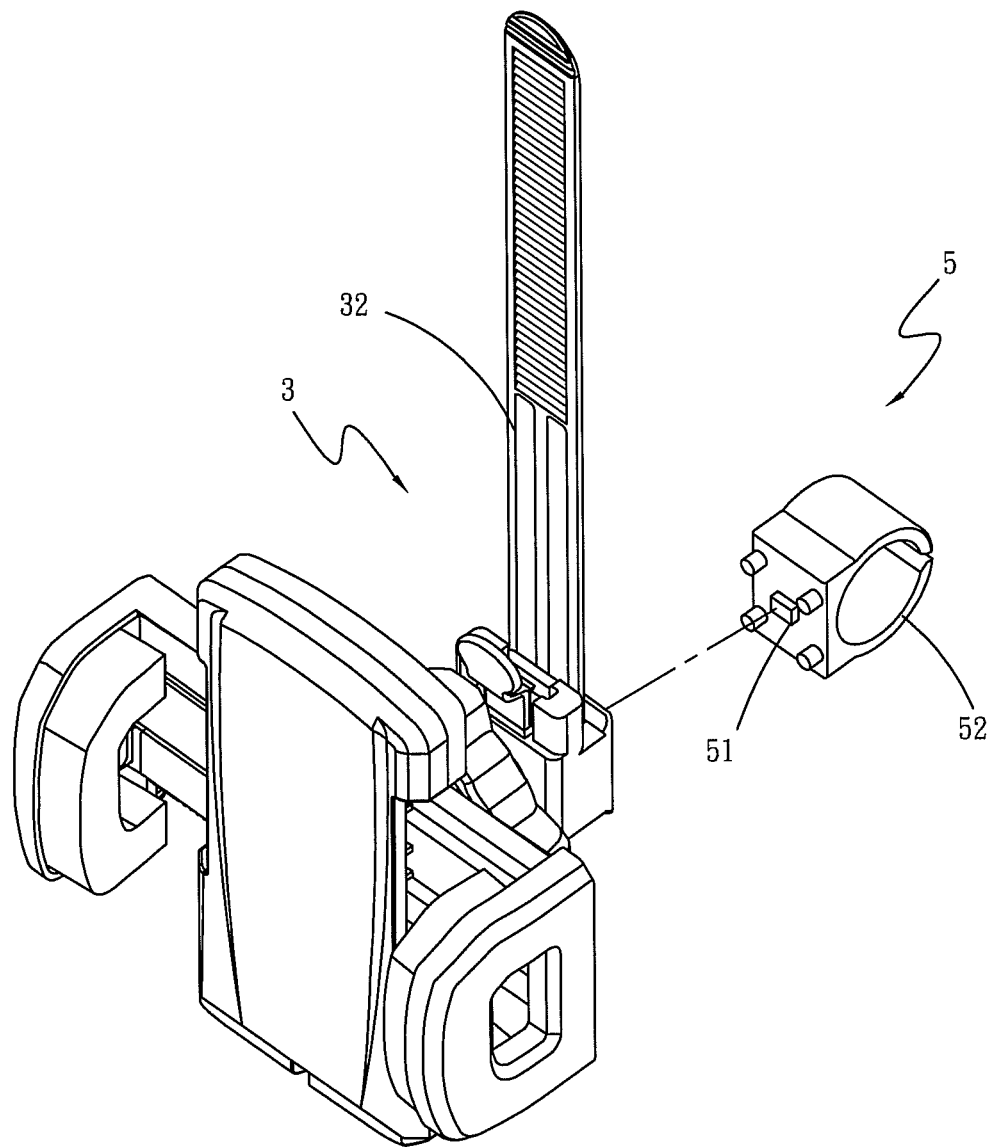
FIG. 9 is an exploded view of another embodiment of the invention.

FIG. 9 illustrates another embodiment of the invention. It includes a fastening member 5 contained a fastening portion 51 and a C-shaped clamp 52. The fastening portion 51 can be fixedly fastened to the rear end of the seat 31 of the strap means 3. The C-shaped clamp 52 is made from rubber and can be clamped on any type of tubular members. Through such a design the fastening member 5 can be clamped on a tubular member, then the strap 32 is wound and strapped to form tight and firm fastening.

What is claimed is:

1. A handset holder, comprising:

a holder including a holding portion at a front end and a protrusive coupling portion at a rear end, the coupling portion including external threads, an indented chamber to hold a chuck which includes a plurality of clamp claws spaced from each other in an annular fashion, a front lid, a rear lid coupled together with the front lid, a left clamp wing and a right clamp wing arranged at the two sides of the rear lid respectively, and an adjustment assembly; the left clamp wing and the right clamp wing respectively having a left saw teeth portion and a right saw teeth portion at a lower edge of the left clamp wing and the right clamp wing; the adjustment assembly including a left gear set, a right gear set engaged with the left gear, a retaining member latched on a lower end of the left gear and an upright spring respectively coupled with the retaining member and the rear lid; the left gear and the right gear being engaged respectively with the left saw teeth portion of the left clamp wing and the right saw teeth portion of the right clamp wing;

a strap means including a seat and a strap fastened to the seat, the strap including a latch teeth section on one surface thereof, the seat including a ball head at a front end thereof to be held in the chuck, a retaining slot threaded through by the strap, and a latch handle extended from one side of the retaining slot, the latch handle including a jutting end pointed towards the retaining slot; and a positioning member being a lid and including an opening in the center thereof and internal threads on an inner rim of the positioning member fastenable to the coupling portion, wherein the holder includes two support members; the rear lid including a housing trough at an upper side thereof, two struts at a lower side of the housing trough arranged in an abreast manner and a fastening strut located below the struts, a latch cavity at the bottom side of the rear lid, and also two hinged holes at two sides of the rear lid and a notch on one lateral side of the rear lid; one outward end of the left clamp wing and the right clamp wing respectively extending a left clamp portion and a right clamp portion, the right clamp wing also including a boss jutting from a rear side thereof, the left clamp wing and the right clamp wing mating each other and held in the housing trough; the adjustment assembly including a transverse spring, and a pushbutton; the transverse spring being located in the housing trough of the rear lid and one end of the transverse spring coupled on the boss of the right clamp wing, the left gear set including a first gear of a smaller diameter and a second gear of a greater diameter, the right gear set including a third gear of a smaller diameter and a fourth gear of a greater diameter, the left gear set and the right gear set being coupled respectively on the two struts of the rear lid, the second gear and the fourth gear being engaged with each other, the first gear and the third gear being engaged respectively with the left saw teeth portion of the left clamp wing and the right saw teeth portion of the right clamp wing; the retaining member including a positioning hole at a lower end thereof and a protrusive portion at one side thereof, the positioning hole being coupled on the fastening strut of the rear lid, the retaining member further including a protrusive latch portion latched on a lower end of the second gear a slant surface on another side of the retaining member, a lower end of the upright spring butting in the latch cavity of the rear lid and an upper end of the upright spring coupled on the protrusive portion of the retaining member; one end of the pushbutton extending outside the notch of the rear lid and another end formed an inclined portion butting the slant surface of the retaining member; each support member including a pivotal head hinged in one hinged hole of the rear lid.

2. The handset holder of claim 1, wherein the left clamp portion and the right clamp portion respectively at an inner side corresponding to each other include a soft pad made from sponge or rubber.

3. The handset holder of claim 1, including a fastening member which includes a fastening portion and a C-shaped clamp, the fastening portion being fastened to a rear end of the seat of the strap means.

4. The handset holder of claim 2, including a fastening member which includes a fastening portion and a C-shaped clamp, the fastening portion being fastened to a rear end of the seat of the strap means.

\* \* \* \* \*